United States Patent Office 3,197,468
Patented July 27, 1965

3,197,468
RIFAMYCIN B HYDRAZIDES
Piero Sensi and Nicola Maggi, Milan, Italy, assignors to
Lepetit S.p.A., Milan, Italy
No Drawing. Filed Feb. 5, 1964, Ser. No. 342,804
Claims priority, application Great Britain, Feb. 18, 1963,
6,460/63
16 Claims. (Cl. 260—239.3)

The present invention concerns new antibiotic substances and the process for their preparation. In the U.S. copending application serial No. 12,654, filed on March 4, 1960, now U.S. Patent No. 3,150,046, the preparation of the antibiotic rifamycin by fermentation of a strain of *Str. mediterranei* ATCC 13685 is described. As stated in said application, rifamycin is a mixture of antibiotic substances. One of these substances, rifamycin B, having the crude formula $C_{39}H_{49}NO_{14}$ is a diacid (pH 1½=2.8, pH 2½=6.7) and one of the acidic groups is a carboxyl group. One of the particular properties of this antibiotic is that it increases in activity when dissolved in water, i.e. it is converted into another substance having higher antibacterial activity. The more active product, called rifamycin S, has the crude formula $C_{37}H_{45}NO_{12}$ and by mild reduction can be converted into another new antibiotic of the rifamycin class, rifamycin SV ($C_{37}H_{47}NO_{12}$). The process for preparing rifamycin SV comprises oxidation of rifamycin B to rifamycin O, hydrolysis of rifamycin O to rifamycin S with release of glycolic acid and reduction of rifamycin S to rifamycin SV. Both rifamycin S and rifamycin SV lack the carboxyl group which is set free in the form of glycolic acid during the activation step.

The structure of rifamycins has been recently elucidated by Prelog and co-workers (communication at the Chemistry and Biochemistry of Fungi and Yeasts Congress which was held in Dublin on July 18, 1963), which established for rifamycin B the following structure:

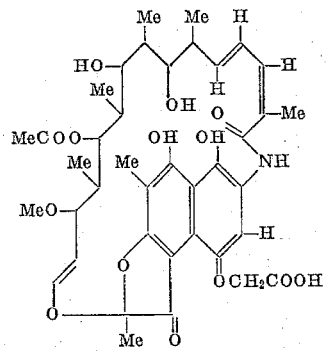

The above formula explains of course how rifamycins O, S and SV are produced from rifamycin B. The sequence of such modifications may be illustrated by considering the sole naphthalene ring present in the molecule:

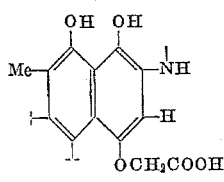 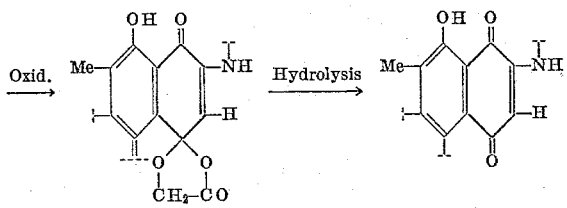

rifamycin B      rifamycin O      rifamycin S

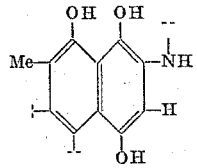

rifamycin SV

The present invention concerns new derivatives of rifamycin B in which the carboxyl group is blocked by conversion into hydrazides. The process for preparing the new derivatives consists in condensing rifamycin B with substituted hydrazines in the presence of dehydrating agents such as carbodiimides in an inert anhydrous solvent. The preferred condensing agent is dicyclohexylcarbodiimide, the preferred solvent is tetrahydrofuran. The condensation is preferably carried out at room temperature (20–25° C.) in 1–3 hours. After concentration of the solvent the formed dicyclohexylurea, sparingly soluble in tetrahydrofuran, crystallises out. The concentrated solution is diluted with dilute hydrochloric acid or sulphuric acid and extracted several times with ethyl acetate.

drazides possess a high antibiotic activity against gram-positive bacteria and *Mycobacterium tuberculosis* as shown in the following table, where the minimal inhibitory concentrations against some microorganisms and *M. tuberculosis* are given.

TABLE

| Rifamycin B hydrazide with— | Minimal inhibitory concentrations γ/ml. | | | | | | | | |
|---|---|---|---|---|---|---|---|---|---|
| | M. aureus | S. faecalis | S. haemol. | B. subt. | Prot. vulg. | E. coli | Kleb. pneum. | Pseud. aer. | Mycobat. tub. |
| Phenylhydrazine | 0.1 | 1 | 0.05 | 3.1 | >200 | >200 | >200 | 200 | 0.037 |
| p-Methylphenyl-hydrazine | 0.3 | 1.5 | 0.03 | 1.5 | >200 | >200 | >200 | 200 | 0.001 |
| (4-pyridyl)-carbohydrazine | 0.5 | 4 | 0.04 | 6.2 | >200 | >200 | >200 | 200 | 0.3 |
| Do | 1.5 | 2 | 0.18 | 12.5 | >200 | <200 | >200 | 200 | 0.4 |
| 4-amino-morpholine | 0.2 | 2.0 | 0.2 | 5 | >200 | <200 | >200 | 200 | 0.45 |
| Aminothiourea | 0.6 | 1.2 | 0.5 | 25 | >200 | <200 | >200 | >200 | 0.18 |
| Dimethylethylhydrazine | 0.002 | 0.03 | 0.0015 | 0.18 | 6.2 | 6.2 | 2.5 | 50 | 0.18 |
| Dimethylpropylhydrazine | 0.003 | 0.02 | 0.0025 | 0.18 | 5 | 3.1 | 25 | 50 | 0.15 |
| Dimethylbutylhydrazine | 0.001 | 0.018 | 0.0045 | 0.045 | 6.2 | 1.5 | 12.5 | 50 | 0.15 |
| Dimethylamylhydrazine | 0.0015 | 0.01 | 0.007 | 0.045 | 6.2 | 2.5 | 12.5 | 50 | 0.18 |
| Diethylmethylhydrazine | 0.0015 | 0.02 | 0.005 | 0.09 | 12.5 | 12.5 | 12.5 | 100 | 0.37 |
| Trimethylhydrazine | 0.006 | 0.05 | 0.002 | 0.18 | 12.5 | 6.2 | 25 | 100 | 0.18 |
| Hydrazine | 0.08 | 0.7 | 0.06 | 3.1 | >200 | 200 | >200 | 200 | 0.15 |
| β-Hydroxyethylhydrazine | 0.1 | 1.5 | 0.015 | 3.1 | ±200 | 100 | 100 | 200 | 0.005 |
| 1-amino-2, 4-dioxo-amidazoline | 1.5 | 12.5 | 0.18 | 12.5 | >200 | >200 | >200 | 200 | 1.2 |
| Di-n-propylmethylhydrazine | 0.001 | 0.015 | 0.0015 | 0.09 | 20 | 6.2 | 5 | 50 | 0.37 |
| Triethylhydrazine | 0.001 | 0.02 | 0.002 | 0.02 | 12.5 | 6.2 | 3.1 | 50 | 0.15 |
| Tripropylhydrazine | 0.002 | 0.03 | 0.003 | 0.10 | 15.6 | 6.2 | 5.2 | 50 | 0.19 |
| Dipropylethylhydrazine | 0.0012 | 0.015 | 0.0012 | 0.045 | 25 | 6.2 | 0.75 | 50 | 0.18 |
| Dipropylbutylhydrazine | 0.01 | 0.08 | 0.007 | 0.8 | 25 | 6.2 | 25 | 50 | 0.075 |
| Diethylpropylhydrazine | 0.001 | 0.02 | 0.0015 | 0.02 | 25 | 6.2 | 25 | 50 | 0.15 |
| Diethylbutylhydrazine | 0.0018 | 0.01 | 0.01 | 0.02 | 12.5 | 6.2 | 25 | 50 | 9.18 |
| 1-methylaminopiperidine | 0.0025 | 0.02 | 9.01 | 0.09 | 12.5 | 6.2 | 25 | 50 | 9.09 |
| 1-ethyl aminopiperidine | 0.0025 | 0.02 | 0.01 | 0.09 | 6.2 | 6.2 | 25 | 25 | 0.045 |
| 1-propylaminopiperidine | 0.002 | 0.01 | 0.01 | 0.045 | 12.5 | 6.2 | 25 | 25 | 0.045 |
| 1-butylaminopiperidine | 0.002 | 0.01 | 0.007 | 0.045 | 6.2 | 6.2 | 25 | 25 | 0.09 |
| 4-ethylaminomorpholine | 0.02 | 0.18 | 0.0012 | 0.75 | 50 | 6.2 | 50 | 100 | 0.37 |
| 4-propylaminomorpholine | 0.007 | 0.06 | 0.005 | 0.37 | 25 | 6.2 | 50 | 100 | 0.37 |
| 4-butylaminomorpholine | 0.02 | 0.18 | 0.02 | 1.5 | >100 | 50 | >100 | >100 | 1.5 |
| Dibutylethylhydrazine (Na salt) | 0.0012 | 0.0005 | 0.01 | 0.045 | 12.5 | 12.5 | 0.37 | 25 | 0.09 |
| Tripropylethylhyrdazine (Na salt) | 0.003 | 0.003 | 0.02 | 0.06 | 25 | 6.2 | 25 | 25 | 0.09 |
| Dibutylmethylhydrazine (Na salt) | 0.0012 | 0.002 | 9.01 | 0.045 | 12.5 | 6.2 | 0.37 | 25 | 0.09 |
| Dipropylbutylhydrazine (Na salt) | 0.002 | 0.0025 | 0.02 | 0.045 | 25 | 6.2 | 25 | 25 | 0.09 |
| Dibutylpropylhydrazine (Na salt) | 0.003 | 0.0025 | 0.02 | 0.03 | 25 | 12.5 | 12.5 | 25 | 0.09 |
| Dibutylmethylhydrazine | 0.012 | 0.085 | 0.0075 | 0.75 | 25 | 6.2 | 25 | 50 | 0.078 |
| Dibutylethylhydrazine | 0.02 | 0.1 | 0.085 | 0.75 | 75 | 6.2 | 25 | 50 | 0.08 |
| Dibutylprogylhydrazine | 0.02 | 0.12 | 0.09 | 0.75 | 75 | 6.2 | 25 | 50 | 0.08 |

The rich ethyl acetate is then concentrated to a small volume and by the addition of petroleum ether the crude rifamycin hydrazide precipitates. The hydrazides are recrystallised from benzene-dicyclohexane or carbon tetrachloride.

Accordingly, the present invention provides as a novel compound a hydrazide of rifamycin B. In particular the invention provides a rifamycin B hydrazide having the general formula:

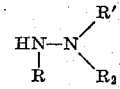

wherein R, R′ and $R_2$ each are a member of the class consisting of hydrogen and alkyl groups, R′ and $R_2$ taken together with the nitrogen to which they are linked form a heterocyclic ring, and when R′ is hydrogen, $R_2$ is a member of the class consisting of hydroxyethyl, aryl, alkylaryl, acyl and thiocarbamyl.

Rifamycin B hydrazides are yellow orange substances having a not too well defined melting point since they decompose above 250° C. They are soluble in methanol, ethanol, benzene, acetone and ethyl acetate and very sparingly soluble in water and petroleum ether. They show an acidic function of a non-carboxylic nature with pH ½ between 3.0 and 4.0 and therefore they form neutral salts both with organic and inorganic bases. The sodium salt of rifamycin B hydrazides are soluble in water at neutral pH. All the prepared hydrazides show an U.V. and visible spectrum similar to that of rifamycin B, with maximum values at 220–225 mµ, 304–306 mµ and 420–425 mµ in buffer solution at pH 7.3. Their specific extinctions $$(E^{1\%}_{1\,cm.})$$

are lower than those of rifamycin B taking into account the increased molecular weight. The rifamycin B hy- Pharmacological tests concerning the toxicity in rats and the per os and subcutaneous effective doses in healing rats with experimental infection by staphylococci have been carried out on several of the described rifamycin B hydrazides. The following data show the high activity and the low toxicity of rifamycin B hydrazides.

| Rifamycin B hydrazides with— | Toxicity in the rat, $LD_{50}$, i.v., mg./kg. | Experimental infection caused by staphylococci in the rat | |
|---|---|---|---|
| | | ED, p.os, mg./kg. | $E.D._{50}$, s.c., mg./kg. |
| Methyldimethylhydrazine | 640 | 58 | 7.4 |
| Methyldiethylhydrazine | 350 | 35.5 | 2.8 |
| Methyldipropylhydrazine | 250 | 28.3 | ~3.5 |
| Methyldibutylhydrazine | 198 | 16 | 3.7 |
| Ethyldimethylhydrazine | 470 | 47 | 2.7 |
| Ethyldiethylhydrazine | 302 | 22 | 2 |
| Ethyldipropylhydrazine | 210 | 20 | 4 |
| Ethyldibutylhydrazine | 188 | 24.6 | 5.67 |
| Propyldimethylhydrazine | 272 | 25 | 2.9 |
| Propyldiethylhydrazine | 192 | 19.5 | 1.7 |
| Propyldipropylhydrazine | 240 | 24.6 | 6.5 |
| Propyldibutylhydrazine | 172 | 20 | 6.5 |
| Butyldimethylhydrazine | 212 | 19 | 2.3 |
| Butyldiethylhydrazine | 129 | >75 | 12.5 |
| Butyldipropylhydrazine | 209 | 24.6 | 6.5 |
| n-Amyldimethylhydrazine | 146 | 16.5 | 2.5 |
| 4-methylaminomorpholine | 865 | >80 | >15 |
| 4-ethylaminomorpholine | 550 | | 6.2 |
| 4-propylaminomorpholine | 360 | | 3.1 |
| 4-butylaminomorpholine | 131 | | ~17 |
| 1-methylaminopiperidine | 280 | ~70 | 3.48 |
| 1-ethylaminopiperidine | 190 | 37.3 | 3 |
| 1-propylaminopiperidine | 185 | 26.4 | ~7 |
| 1-butylaminopiperidine | 149 | 34.8 | 5 |

The following non-limitative examples are illustrative of the invention.

EXAMPLE 1

*Rifamycin B trimethylhydrazide*

An amount of 5 g. of rifamycin B is suspended in 250 ml. of tetrahydrofuran. Then 1.350 g. of dicyclohexylcarbodiimide are added followed by 0.500 g. of trimethylhydrazine dissolved in 250 ml. of tetrahydrofuran. After the addition, carried out in 30 minutes under strong stirring, the mixture is allowed to stand for two hours, then concentrated to 30–40 ml. The precipitated dicyclohexylurea is filtered off, the filtrate is poured into dilute hydrochloric acid and extracted with ethyl acetate. The ethyl acetate extract is dried over sodium sulphate, filtered, concentrated to 30–40 ml. and poured into 500 ml. of petroleum ether. The hydrazide precipitates in the form of a yellow orange amorphous powder which is collected and dried in vacuo. Yield 4.5 g. The crude product is dissolved in 2500 ml. of cyclohexane at 60° C., filtered from some insoluble portion and concentrated to about 100 ml. The semi-crystalline hydrazide precipitated during the concentration is collected, giving 2.6 g. of rifamycin B trimethylhydrazide. Analysis.—Calcd. for $C_{49}H_{57}N_3O_{13}$: C, 65.67; H, 6.41; N, 4.68; M.W. 895.970. Found: C, 62.27; H, 7.31; N, 4.80.

EXAMPLE 2

Rifamycin B trimethylhydrazide sodium salt

Five grams of rifamycin B triethylhydrazide are dissolved in 100 ml. of methanol and the solution is adjusted to pH 8.6 with sodium methoxide. An amount of 100 ml. of methyl isobutyl ketone is added, the solution is concentrated to a small volume in vacuo and the concentrate is poured into 500 ml. of ethyl ether. The precipitated rifamycin B trimethylhydrazide sodium salt is then collected and dried in vacuo. It appears as a yellowish powder, very soluble in water, fairly soluble in methanol and acetone and sparingly soluble in ethyl ether and petroleum ether.

EXAMPLES 3–13

According to the process of Example 1 the following rifamycin B hydrazides were prepared. Their corresponding sodium salts were also prepared according to the process of Example 2.

Condensation product of rifamycin B with phenylhydrazine: $C_{45}H_{55}N_3O_{13}$, M.W. 845.914. Analysis: C, 63.88; H, 6.5; N, 4.96. Found: C, 63.13; H, 6.94; N, 5.10.

Condensation product of rifamycin B with p-phenylmethylhydrazine: $C_{46}H_{57}N_3O_{13}$, M.W. 859.940. Analysis: C, 64.19; H, 6.67; N, 4.88. Found: C, 63.3; H, 6.98; N, 4.94.

Condensation product of rifamycin B with (4-pyridyl)-carbohydrazine: $C_{45}H_{54}N_4O_{14}$, M.W. 874.914. Analysis: C, 61.71; H, 6.21; N, 6.39. Found: C, 60.40; H, 6.59; N, 6.40.

Condensation product of rifamycin B with (4-pyridyl)-carbohydrazidine: $C_{45}H_{55}N_5O_{13}$, M.W. 873.930. Analysis: C, 61.82; H, 6.34; N, 8.01. Found: C, 60.79; H, 6.48; N, 8.32.

Condensation product of rifamycin B with 4-aminomorpholine: $C_{43}H_{57}N_3O_{14}$, M.W. 839.910 Analysis: C, 61.43; H, 6.83; N, 5.00. Found: C, 60.04; H, 6.24; N, 4.77.

Condensation product of rifamycin B with aminothiourea: $C_{40}H_{52}N_4SO_{13}$, M.W. 828.914. Analysis: C, 57.93; H, 6.32; N, 6.75; S, 3.86. Found: C, 57.56; H, 6.79; N, 6.52; S, 3.17.

Condensation product of rifamycin B with dimethylethylhydrazine: $C_{43}H_{59}N_3O_{13}$, M.W. 825.95. Analysis: C, 62.48; H, 7.19; N, 5.08. Found: 61.62; H, 6.34; N, 4.65.

Condensation product of rifamycin B with dimethylpropylhydrazine: $C_{44}H_{61}N_3O_{13}$, M.W. 839.972. Analysis: C, 62.88; H, 7.31; N, 4.99. Found: C, 62.63; H, 7.67; N, 4.92.

Condensation product of rifamycin B with dimethylbutylhydrazine: $C_{45}H_{63}N_3O_{13}$, M.W. 853.978. Analysis: C, 63.23; H, 7.42; N, 4.91. Found: C, 63.19; H, 7.52; N, 4.71.

Condensation product of rifamycin B with dimethylamylhydrazine: $C_{46}H_{65}N_3O_{13}$, M.W. 868.004. Analysis: C, 63.64; H, 7.54; N, 4.84. Found: C, 63.53; H, 7.61; N, 4.99.

Condensation product of rifamycin B with diethylmethylhydrazine: $C_{44}H_{61}N_3O_{13}$, M.W. 839.952. Analysis: C, 62.88; H, 7.31; N, 5.00. Found: C, 63.00; H, 7.60; N, 4.89.

EXAMPLES 14–35

Condensation product of rifamycin B with hydrazine: $C_{39}H_{51}N_3O_{13}$, M.W. 769.8. Analysis: C, 60.84; H, 6.67; N, 5.45. Found: C, 61.12; H, 7.20; N, 5.80.

Condensation product of rifamycin B with di, n-propylethyl hydrazine: $C_{41}H_{55}N_3O_{14}$, M.W. 813.6. Analysis: C, 60.6; H, 6.77; N, 5.16. Found: C, 61.02; H, 7.15; N, 5.

Condensation product of rifamycin B with 1-amino-2,4-dioxo imidazoline: $C_{42}H_{52}N_4O_{15}$, M.W. 852.3. Analysis: C, 59.2; H, 6.13; N, 6.56. Found: C, 62.31; H, 6.92; N, 6.

Condensation product of rifamycin B with di-n-propylmethylhydrazine: $C_{46}H_{65}N_3O_{13}$, M.W. 868.01. Analysis: C, 63.65; H, 7.54; N, 4.84. Found: C, 64.14; H, 7.70; N, 4.80.

Condensation product of rifamycin B with dimethylethyl hydrazine: $C_{43}H_{59}N_3O_{13}$, M.W. 825.95. Analysis: C, 62.53; H, 7.20; N, 5.08. Found: C, 61.92; H, 6.34; N, 4.65.

Condensation product of rifamycin B with triethyl hydrazine: $C_{45}H_{63}N_3O_{13}$, M.W. 853.99. Analysis: C, 63.28; H, 7.43; N, 4.92. Found: C, 63.32; H, 7.45; N, 4.62.

Condensation product of rifamycin B with dipropylethyl hydrazine: $C_{47}H_{67}N_3O_{13}$, M.W. 882.03. Analysis: C, 64.00; H, 7.65; N, 4.76. Found: C, 63.70; H, 7.50; N, 4.58.

Condensation product of rifamycin B with diethyl-propyl hydrazine: $C_{46}H_{65}N_3O_{13}$, M.W. 868.01. Analysis: C, 63.65; H, 7.54; N, 4.84. Found: C, 64.06; H, 7.86; N, 5.05.

Condensation product of rifamycin B with diethyl-butyl hydrazine: $C_{47}H_{67}N_3O_{13}$, M.W. 882.03. Analysis: C, 64.00; H, 7.65; N, 4.76. Found: C, 63.57; H, 7.85; N, 4.80.

Condensation product of rifamycin B with 1-methylamino piperidine: $C_{45}H_{61}N_3O_{13}$, M.W. 851.98. Analysis: C, 63.43; H, 7.21; N, 4.93. Found: C, 63.28; H, 7.59; N, 4.64.

Condensation product of rifamycin B with 1-ethylamino piperidine: $C_{46}H_{63}N_3O_{13}$, M.W. 866.0. Analysis: C, 63.79; H, 7.33; N, 4.85. Found: C, 63.55; H, 7.58; N, 4.80.

Condensation product of rifamycin B with 1-propylamino piperidine: $C_{47}H_{65}N_3O_{13}$, M.W. 880.02. Analysis: C, 64.14; H, 7.44; N, 4.77. Found: C, 63.79; H, 7.70; N, 4.57.

Condensation product of rifamycin B with 1-butylamino piperidine: $C_{48}H_{67}N_3O_{13}$, M.W. 894.02. Analysis: C, 64.48; H, 7.55; N, 4.70. Found: C, 64.15; H, 7.88; N, 4.38.

Condensation product of rifamycin B with 4-methyl-amino-morpholine: $C_{44}H_{59}N_3O_{14}$, M.W. 853.97. Analysis: C, 61.85; H, 6.96; N, 4.92. Found: C, 61.31; H, 7.25; N, 4.81.

Condensation product of rifamycin B with 4-ethyl-amino-morpholine: $C_{45}H_{61}N_3O_{14}$, M.W. 867.99. Analysis: C, 62.26; H, 7.08; N, 4.84. Found: C, 61.50; H, 7.39; N, 4.86.

Condensation product of rifamycin B with 4-propyl-amino morpholine: $C_{46}H_{63}N_3O_{14}$, M.W. 882.01. Analysis: C, 62.64; H, 7.19; N, 4.76. Found: C, 61.18; H, 7.67; N, 4.65.

Condensation product of rifamycin B with 4-butyl-amino morpholine: $C_{47}H_{65}N_3O_{14}$, M.W. 896.03. Analysis: C, 63.00; H, 7.31; N, 4.68. Found: C, 61.92; H, 7.52; N, 4.40.

Condensation product between rifamycin B and tripropylhydrazine: $C_{48}H_{69}N_3O_{13}$, M.W. 896.05. Analysis: C, 64.34; H, 7.76; N, 468. Found: C, 64.15; H, 7.69; N, 4.53.

Condensation product between rifamycin B and diproyl-butylhydrazine: $C_{49}H_{71}N_3O_{13}$, M.W. 910.07. Analysis: C, 64.66; H, 7.86; N, 4.61. Found: C, 64.23; H, 7.95; N, 4.57.

Condensation product between rifamycin B and dibutyl-methyl-hydrazine: $C_{48}H_{69}N_3O_{13}$, M.W. 896.08: Analysis: C, 64.34; H, 7.76; N, 4.68. Found: C, 64.41; H, 7.90; N, 4.49.

Condensation product between rifamycin B and dibutyl-ethyl-hydrazine: $C_{49}H_{71}N_3O_{13}$, M.W. 910.07. Analysis: C, 64.66; H, 7.86; N, 4.61. Found: C, 63.53; H, 7.65; N, 4.35.

Condensation product between rifamycin B and dibutyl-propyl-hydrazine: $C_{50}H_{73}N_3O_{13}$, M.W. 924.09. Analysis: C, 64.98; H, 7.96; N, 4.54. Found: C, 64.33; H, 8.05; N, 4.42.

We claim:

1. A process for preparing rifamycin B hydrazides, which comprises reacting, in a solvent and in the presence of a water-eliminating agent, rifamycin B with a hydrazine of the formula:

wherein R is selected from the class consisting of hydrogen and lower alkyl, and NB is selected from the class consisting of amino, mono- and di-lower alkylamino, hydroxyethylamino, anilino, lower alkyl-phenylamino, 4-pyridylcarbamyl, 4-pyridylamidino, 1-piperidino, 4-morpholino, 1-hydantoino and 1-thioureido.

2. A process for preparing hydrazides of rifamycin B according to claim 1 in which the water eliminating agent is dicyclohexylcarbodiimide.

3. A process as in claim 2 wherein rifamycin B is reacted with β-hydroxyethyl hydrazine.

4. A process as in claim 2 wherein rifamycin B is reacted with dipropylethyl hydrazine.

5. A process as in claim 2 wherein rifamycin B is reacted with 1-methylamino piperidine.

6. A process as in claim 2 wherein rifamycin B is reacted with 1-ethylamino piperidine.

7. A process as in claim 2 wherein rifamycin B is reacted with 1-propylamino piperidine.

8. A rifamycin B hydrazide selected from the class consisting of the reaction products of rifamycin B and hydrazines of the formula

wherein R is selected from the class consisting of hydrogen and lower alkyl, and NB is selected from the class consisting of amino, mono- and di-lower alkylamino, hydroxyethylamino, anilino, lower alkyl-phenylamino, 4-pyridylcarbamyl, 4-pyridylamidino, 1-piperidino, 4-morpholino, 1-hydantoino and 1-thioureido.

9. Rifamycin B β-hydroxy-ethyl-hydrazide.
10. Rifamycin B dipropyl-ethyl-hydrazide.
11. 1-(N-methyl-rifamycinamido)-piperidine.
12. 1-(N-ethyl-rifamycinamido)-piperidine.
13. 1-(N-propyl-rifamycinamido)-piperidine.
14. 4-(N-ethyl-rifamycinamido)-morpholine.
15. 4-(N-propyl-rifamycinamido)-morpholine.
16. 4-(N-butyl-rifamycinamido)-morpholine.

No references cited.

WALTER A. MODANCE, *Primary Examiner.*